United States Patent
Du et al.

(10) Patent No.: US 11,205,120 B2
(45) Date of Patent: Dec. 21, 2021

(54) SYSTEM AND METHOD FOR TRAINING DEEP LEARNING CLASSIFICATION NETWORKS

(71) Applicant: Samsung Electronics Co., Ltd., Gyeonggi-do (KR)

(72) Inventors: Xianzhi Du, College Park, MD (US); Mostafa El-Khamy, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 995 days.

(21) Appl. No.: 15/588,223

(22) Filed: May 5, 2017

(65) Prior Publication Data
US 2018/0181881 A1   Jun. 28, 2018

Related U.S. Application Data

(60) Provisional application No. 62/438,177, filed on Dec. 22, 2016, provisional application No. 62/438,795, filed on Dec. 23, 2016.

(51) Int. Cl.
*G06N 3/08* (2006.01)
*G06N 20/00* (2019.01)
(Continued)

(52) U.S. Cl.
CPC ............... *G06N 3/08* (2013.01); *G06K 9/62* (2013.01); *G06K 9/6256* (2013.01);
(Continued)

(58) Field of Classification Search
CPC ...... G06N 20/00; G06N 3/0454; G06N 3/084; G06N 7/005; G06K 9/62; G06K 9/6256
See application file for complete search history.

(56) References Cited

U.S. PATENT DOCUMENTS 9,373,059 B1   6/2016 Heifets et al.
9,443,320 B1   9/2016 Gaidon et al.
(Continued)

FOREIGN PATENT DOCUMENTS

| WO | WO 2014/205231 | 12/2014 |
|---|---|---|
| WO | WO 2016/118332 | 7/2016 |
| WO | WO 2016/179808 | 11/2016 |

OTHER PUBLICATIONS

Umemura et al., "Image Labeling for LIDAR Intensity Image Using K-NN of Feature Obtained by Convolutional Neural Network", International Archives of the Photogrammetry, Remote Sensing and Spatial Information Sciences, vol. XLI-B3, Jul. 2016, pp. 931-935 (Year: 2016).*

(Continued)

*Primary Examiner* — Daniel C Puentes
(74) *Attorney, Agent, or Firm* — The Farrell Law Firm, P.C.

(57) ABSTRACT

Apparatuses and methods of manufacturing same, systems, and methods for training deep learning machines are described. In one aspect, candidate units, such as detection bounding boxes in images or phones of an input audio feature, are classified using soft labelling, where at least label has a range of possible values between 0 and 1 based, in the case of images, on the overlap of a detection bounding box and one or more ground-truth bounding boxes for one or more classes.

17 Claims, 5 Drawing Sheets

(51) Int. Cl.
*G06K 9/62* (2006.01)
*G06N 3/04* (2006.01)
*G06N 7/00* (2006.01)

(52) U.S. Cl.
CPC .......... *G06N 3/0454* (2013.01); *G06N 3/084* (2013.01); *G06N 7/005* (2013.01); *G06N 20/00* (2019.01)

(56) References Cited

U.S. PATENT DOCUMENTS

| | | | |
|---|---|---|---|
| 2009/0012682 A1* | 1/2009 | Mathis | F16H 61/0213 701/52 |
| 2016/0035078 A1 | 2/2016 | Lin et al. | |
| 2016/0171429 A1 | 6/2016 | Schwartz | |
| 2016/0307347 A1 | 10/2016 | Matteson et al. | |
| 2017/0206431 A1* | 7/2017 | Sun | G06F 16/5838 |
| 2021/0209412 A1* | 7/2021 | Quader | G06N 20/10 |

OTHER PUBLICATIONS

Maas et al., "Lexicon-Free Conversational Speech Recognition with Neural Networks", Human Language Technologies: The 2015 Annual Conference of the North American Chapter of the ACL, Jun. 2015, pp. 345-354 (Year: 2015).*
Dai et al, "Convolutional Feature Masking for Joint Object and Stuff Segmentation", 2015, arXiv, all pages (Year: 2015).*
Auda et al, "Voting Schemes For Cooperative Neural Network Classifiers", Dec. 1995, all pages (Year: 1995).*
Dai, Jifeng et al., R-FCN: Object Detection via Region-based Fully Convolutional Networks, 30th Conference on Neural Information Processing Systems (NIPS 2016) Barcelona, Spain, 9 pages.
Girshick, Ross, Fast R-CNN, 2015 IEEE International Conference on Computer Vision, pp. 1440-1448.
Ren, Shaoqing et al., Faster R-CNN: Towards Real-Time Object Detection with Region Proposal Networks, Neural Information Processing Systems, Jan. 2016, 14 pages.
Lecun, Yann et al., Deep Learning, Nature, vol. 521, May 28, 2015, pp. 436-444.
Du, Xianzhi et al., Fused DNN: A deep neural network fusion approach to fast and robust pedestrian detection, arXiv, Oct. 11, 2016, 11 pages.
Girshick, Ross et al., Rich feature hierarchies for accurate object detection and semantic segmentation, 2014 IEEE Conference on Computer Vision and Pattern Recognition, pp. 580-587.
Reed, Scott E. et al., Training deep neural networks on noisy labels with bootstrapping, arXiv, ICLR 2015 , Apr. 15, 2015, 11 pages.
Varshneya, Daksh, et al., Restaurant Attribute classification using Deep Learning, 2016 IEEE, 6 pages.
Mathworks, Train an R-CNN deep learning object detector, https://www.mathworks.com/help/vision/ref/trainrcnnobjectdetector.html, 9 pages.
Szegedy, Christian et al., Rethinking the Inception Architecture for Computer Vision, 2016 IEEE Conference on Computer Vision and Pattern Recognition, pp. 2818-2826.
Yan, Junjie et al., Object detection by labeling superpixels, 2015 IEEE, pp. 5107-5116.
Singh, Diveesh et al., Using convolutional neural networks and transfer learning to perform yelp restaurant photo classification, Sep. 16, 2016, pp. 4321-4329.
Geng, Mengyue et al., Deep transfer learning for person re-identification, arXiv, Nov. 22, 2016, 12 pages.

* cited by examiner

SYSTEM AND METHOD FOR TRAINING DEEP LEARNING CLASSIFICATION NETWORKS

PRIORITY

This application claims priority under 35 U.S.C. § 119(e) to U.S. Provisional Patent Application Ser. No. 62/438,177 filed at the U.S. Patent & Trademark Office on Dec. 22, 2016, and U.S. Provisional Patent Application Ser. No. 62/438,795 filed at the U.S. Patent & Trademark Office on Dec. 23, 2016, the entire contents of both of which are incorporated herein by reference.

FIELD

The present disclosure relates generally to deep neural networks, and more particularly, to a system and method for training deep learning classification networks.

BACKGROUND

Machine learning technology is continually evolving and has come to support many aspects of modern society, from web searches, content filtering, automated recommendations on merchant websites, automated game playing, to object detection, image classification, speech recognition, machine translations, and drug discovery and genomics. The current state of the art in the field of machine learning are deep neural networks, which use computational models composed of multiple processing layers which learn representations of data (usually, extremely large amounts of data) with multiple levels of abstraction—hence, the terminology "deep learning", "deep networks," etc. See, e.g., LeCun, Yann, Yoshua Bengio, and Geoffrey Hinton. "Deep learning." Nature, vol. 521, pp. 436-444 (28 May 2015), which is hereby incorporated herein by reference in its entirety.

The first stage in machine learning for object detection and classification is training. In regards to images, training is performed using a large data set of images of, e.g., people, pets, cars, and houses, where each image, or portion within the image, is labelled with a corresponding category or class. There are a number of publicly available data sets. This training involving images may be separated into two parts/stages: (1) detection, where candidate/detected boxes (which are usually based on confidence levels of an object/class being within the box but may also be just random crops) are detected within an image, and (2) classification, where labels are assigned to the detection boxes based on their overlap with "ground-truth" boxes—i.e., the boxes in the images of the dataset already known to contain the object/class.

FIG. 1 illustrates an example of a detection box 110 and a ground-truth box 120 for class/object A in the classification stage. Detection (bounding) box 110 covers area $A_{BB_d}$ and ground-truth (bounding) box 120 covers area $A_{BB_g}$. The label of detection box 110 for class/object A is conventionally determined in the classification stage according to Equation (1):

$$\text{label} = \begin{cases} 1, & \text{if } \dfrac{A_{BB_d} \cap A_{BB_g}}{A_{BB_d} \cup A_{BB_g}} > 0.5 \\ 0, & \text{otherwise} \end{cases} \quad (1)$$

where $A_{BB_d} \cap A_{BB_g}$ is the area of overlap of detection box 110 and ground-truth box 120, as shown by the thatched area indicated by reference numeral 115 in FIG. 1, and $A_{BB_d} \cup A_{BB_g}$ is the union of the area of detection box 110 and the ground-truth box 120 (i.e., sum of areas of all of detection box 110 and ground truth box 120 minus the thatched area 115).

According to Equation (1), the label of detection box 110 for class/object A is a simple binary value, where the label=1 when more than half of detection box 110 overlaps with ground-truth box 120 and the label=0 when half, or less than half, of the area of detection box 110 overlaps with ground-truth box 210. In FIG. 1, the label for detection box 110 would be 0 for class/object A.

These labels are used as part of determining and correcting the error of the machine. Generally speaking, in training, the machine modifies its internal adjustable parameters to reduce the error calculated from an objective function. In this case, the objective function may be thought of as measuring the error (or distance) by generating the detection box labels in terms of the known ground-truth boxes. The internal adjustable parameters, often called weights, of the machine are what define the input-output function of the machine. In a typical deep-learning system, there may be hundreds of millions of such adjustable weights/parameters, and hundreds of millions of labelled examples with which to train the machine.

Accordingly, labelling during the training process affects the efficiency and accuracy of deep learning machines/networks.

SUMMARY

Accordingly, the present disclosure has been made to address at least the problems and/or disadvantages described herein and to provide at least the advantages described below.

According to an aspect of the present disclosure, a method for deep learning training is provided which includes receiving candidate units for classification and classifying the candidate units by soft labelling, wherein the soft labelling provides at least one label comprising a plurality of possible values in a range between 0 and 1.

According to an aspect of the present disclosure, an apparatus for deep learning training is provided, including one or more non-transitory computer-readable media; and at least one processor which, when executing instructions stored on one or more non-transitory computer readable media, performs the steps of receiving candidate units for classification and classifying the candidate units by soft labelling, wherein the soft labelling provides at least one label comprising a plurality of possible values in a range between 0 and 1.

According to an aspect of the present disclosure, a method is provided for manufacturing a chipset capable of deep learning training which includes at least one processor which, when executing instructions stored on one or more non-transitory computer readable media, performs the steps of receiving candidate units for classification and classifying the candidate units by soft labelling, wherein the soft labelling provides at least one label comprising a plurality of possible values in a range between 0 and 1; and the one or more non-transitory computer-readable media which store the instructions.

According to an aspect of the present disclosure, a method is provided for testing an apparatus, including testing whether the apparatus has at least one processor which, when executing instructions stored on one or more non-transitory computer readable media, performs deep learning training including the steps of receiving candidate units for classification and classifying the candidate units by soft labelling, wherein the soft labelling provides at least one label comprising a plurality of possible values in a range between 0 and 1; and testing whether the apparatus has the one or more non-transitory computer-readable media which store the instructions.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
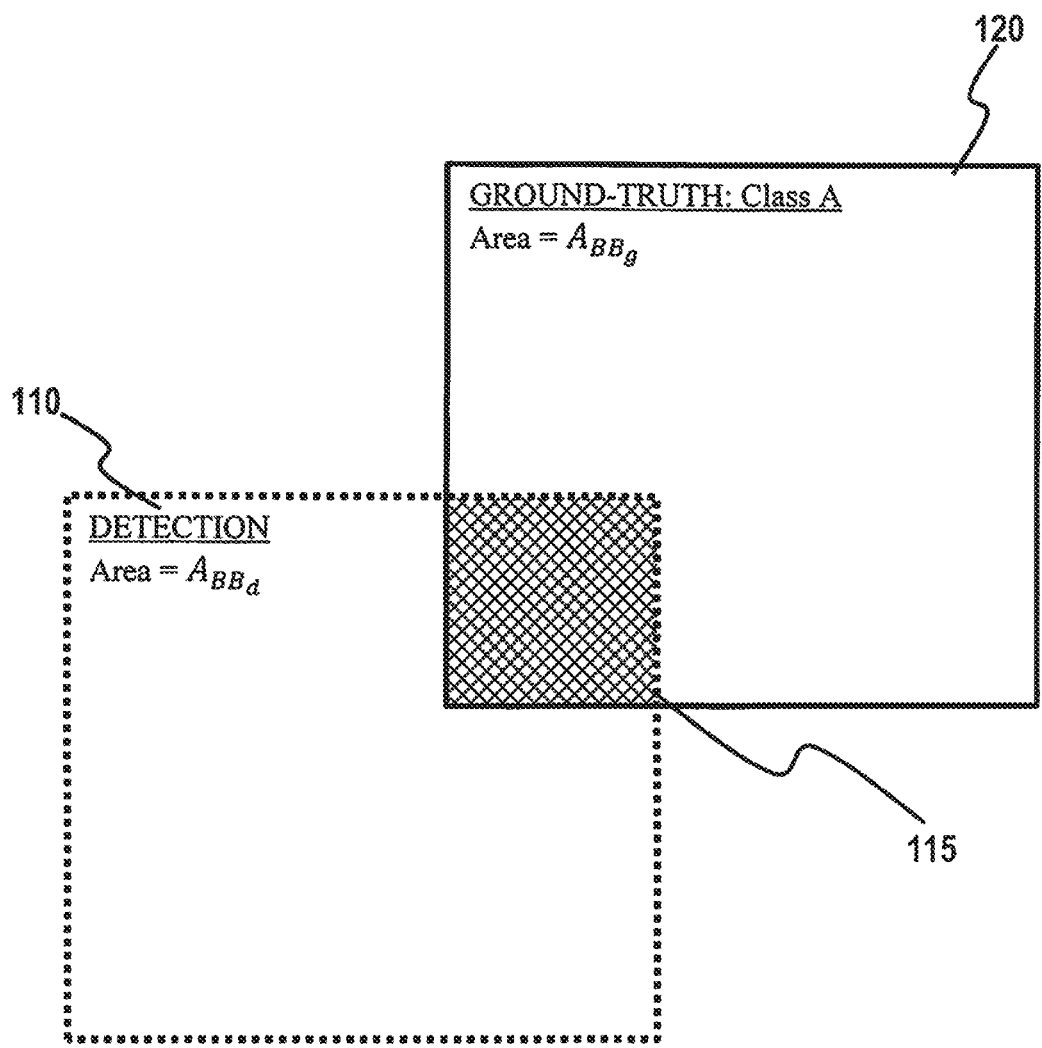
FIG. 1 illustrates an example of a detection box 110 and a ground-truth box 120 for class/object A in the classification stage of the deep learning training process, to which embodiments of the present disclosure may be applied.

Hereinafter, embodiments of the present disclosure are described in detail with reference to the accompanying drawings. It should be noted that the same elements are designated by the same reference numerals although they are shown in different drawings. In the following description, specific details such as detailed configurations and components are merely provided to assist in the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or custom. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although terms including an ordinal number such as first and second may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may include one or more elements. An element may include any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearance of the phrase "one embodiment" (or "an embodiment") in various places in this specification does not necessarily refer to the same embodiment.

The present application concerns machine learning as applied to methods for acquiring, processing, analyzing, and understanding digital images, as used in, for example, object detection, object recognition, and object classification of what is in an image or a portion of an image.

Embodiments of the present disclosure are directed to "soft labelling" (more fully described below), which provides greater efficiency and accuracy during the training process.

Generally speaking, labelling in regards to images is used to assign one or more classes/objects/categories to a detection candidate bounding box based on its overlap with one or more ground-truth bounding boxes for those classes/objects/categories.

As discussed above, conventional labelling for each detection candidate bounding box in regards to each class/object/category is either 1 or 0 (hereinafter, this discrete binary labelling will be referred to as "hard labelling"). However, hard labelling leads to a loss of precision in regards to determining the internal adjustable parameters/weights of the machine during the training phase.

When training, maximizing the likelihood of parameter θ given label t and observed feature z is equivalent to minimizing the error ε, i.e., minimizing the negative log-likelihood function shown in Equation (2):

$$\varepsilon = -\log L(\theta \mid t, z) = -\sum_{i=1}^{c} t_i * \log(y_i) \qquad (2)$$

where C is the total number of classes, $t_i$ is the label of class i (where i=1, 2, ..., C), and $y_i$ is the softmax probability of class i given observed feature z. For example, $y_c$, the softmax probability of class c given observed feature z (i.e., P(t=c|z)), can be calculated using Equation (3):

$$y_c = P(t = c \mid z) = \frac{e^{z_c}}{\sum_{i=1}^{C} e^{z_i}} \quad (3)$$

However, when training with hard labelling, $t_c$ only equals 1 when class c is the true class according to the ground truth labelling for input feature z and otherwise equals 0. See, e.g., Eq. (1) above. This means that only the softmax probability for true class c contributes to the summation in Equation (2).

In embodiments of the present disclosure, the label is not binary, but may take any value from 0 to 1—i.e., $t_c$ is a float value between [0,1] (hereinafter referred to as "soft labelling"). In this manner, the loss in Equation (2) can be computed as the weighted sum of all of the softmax probabilities (large and small) from all classes. The possible options for assigning float values between [0,1] in soft labelling are practically endless, as would be understood by one of ordinary skill in the art, although several specific assignment techniques are discussed below.

Before discussing examples of assignment schemes using soft labelling, it must be confirmed that soft labelling still allows for performing proper back-propagation. The log-likelihood function $-\log L(\theta|t,z)$ in Equation (2) is also the cross-entropy error function $\xi(t,z)$. When doing back-propagation for class i, the derivative $\partial\xi/\partial z_i$ of the cross entropy cost function with respect to softmax observed input $z_i$ can be calculated as shown in Equation (4):

$$\partial\xi/\partial z_i = y_i - t_i \quad (4)$$

Thus, as would be understood by one of ordinary skill in the art, this holds as long as $\Sigma_{j=1:C} t_j = 1$, i.e., as long as the sum of labels over all classes for the same input feature is 1, which is true for both hard labelling and soft labelling. In other words, Equation (4) above still holds for soft labelling since the sum of labels is unity.

Figure 2:
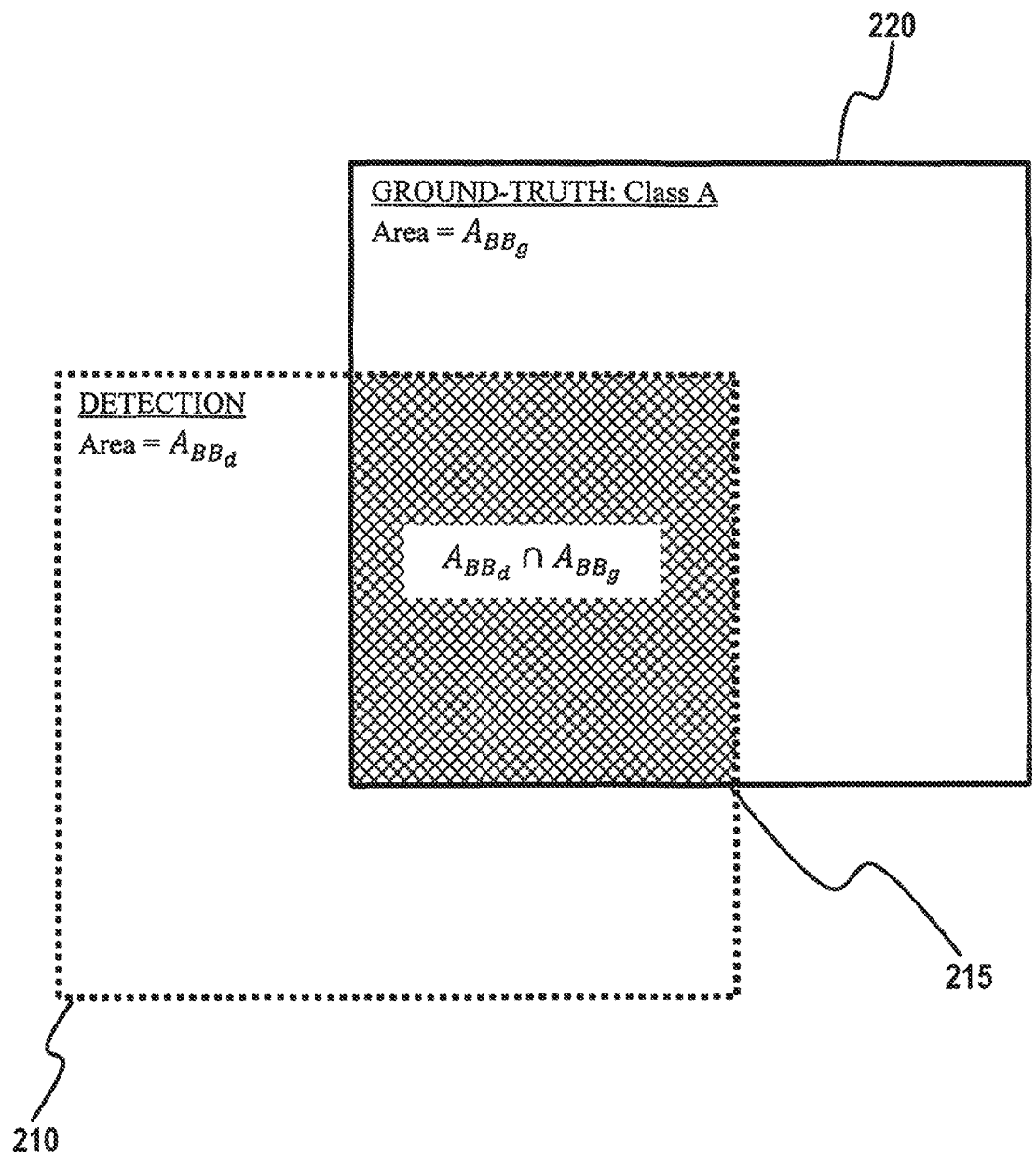
FIG. 2 illustrates examples of soft labelling assignment schemes using detection box 210 and a ground-truth box 220, according to one embodiment.

FIG. 2 illustrates examples of soft labelling assignment schemes using detection box 210 and a ground-truth box 220, according to one embodiment.

In FIG. 2, detection box 210 covers area $A_{BB_d}$ and ground-truth box 220 covers area $A_{BB_g}$, which intersect at area 215. There are two classes in FIG. 2, "A" and "background", and thus two labels are needed for detection box 210: $L_A$ and $L_{bg}$, respectively. The labels of detection box 210 for class/object A and class/object background are determined according to Equations (5)(a) and 5(b):

$$L_A = \frac{A_{BB_d} \cap A_{BB_g}}{A_{BB_d}} \quad (5)(a)$$

$$L_{bg} = 1 - L_A = \frac{A_{BB_d}}{A_{BB_d}} - \frac{A_{BB_d} \cap A_{BB_g}}{A_{BB_d}} \quad (5)(b)$$

where $A_{BB_d} \cap A_{BB_g}$ is the area of intersection/overlap of detection box 210 and ground-truth box 220, as shown as the thatched area indicated by reference numeral 215 in FIG. 2. Thus, in Equation (5)(a), label $L_A$ equals the intersection area 215 of the two boxes normalized by the area of the detection box 210, while label $L_{bg}$ equals the normalized remainder, i.e., one minus the soft label $L_A$ for class A. This soft labelling method satisfies the constraint that $L_A + L_{bg} = 1$.

In another soft labelling assignment scheme according to an embodiment of the present disclosure, threshold values are used to choose among 0, 1, and a variable value determined by the ratio of the intersection to the entire detection box. More specifically, using the boxes in FIG. 2 as examples, the labels of detection box 210 for class/object A and class/object background are determined according to Equations (6)(a) and (6)(b):

$$L_A = \begin{cases} 1, & \text{if } \frac{A_{BB_d} \cap A_{BB_g}}{A_{BB_d}} > b \\ \frac{A_{BB_d} \cap A_{BB_g}}{A_{BB_d}}, & \text{if } b \geq \frac{A_{BB_d} \cap A_{BB_g}}{A_{BB_d}} \geq a \\ 0, & \text{if } \frac{A_{BB_d} \cap A_{BB_g}}{A_{BB_d}} < a \end{cases} \quad (6)(a)$$

$$L_{bg} = 1 - L_A \quad (6)(b)$$

where, if the intersection area is greater than threshold b, $L_A = 1$; if the intersection area is less than threshold a, $L_A = 0$; and, otherwise, $L_A$=the normalized value of the intersection (i.e., the intersection divided by the total area of the detection box). Because this soft labelling scheme assigns 0 and 1 to area ranges, it may be considered a combination of soft labelling and hard labelling, or as a "hybrid" labelling scheme. However, any label assignment scheme that uses a range of values in [0,1] is soft labelling, even if 0 and 1 are also assigned to other labels.

Figure 3:
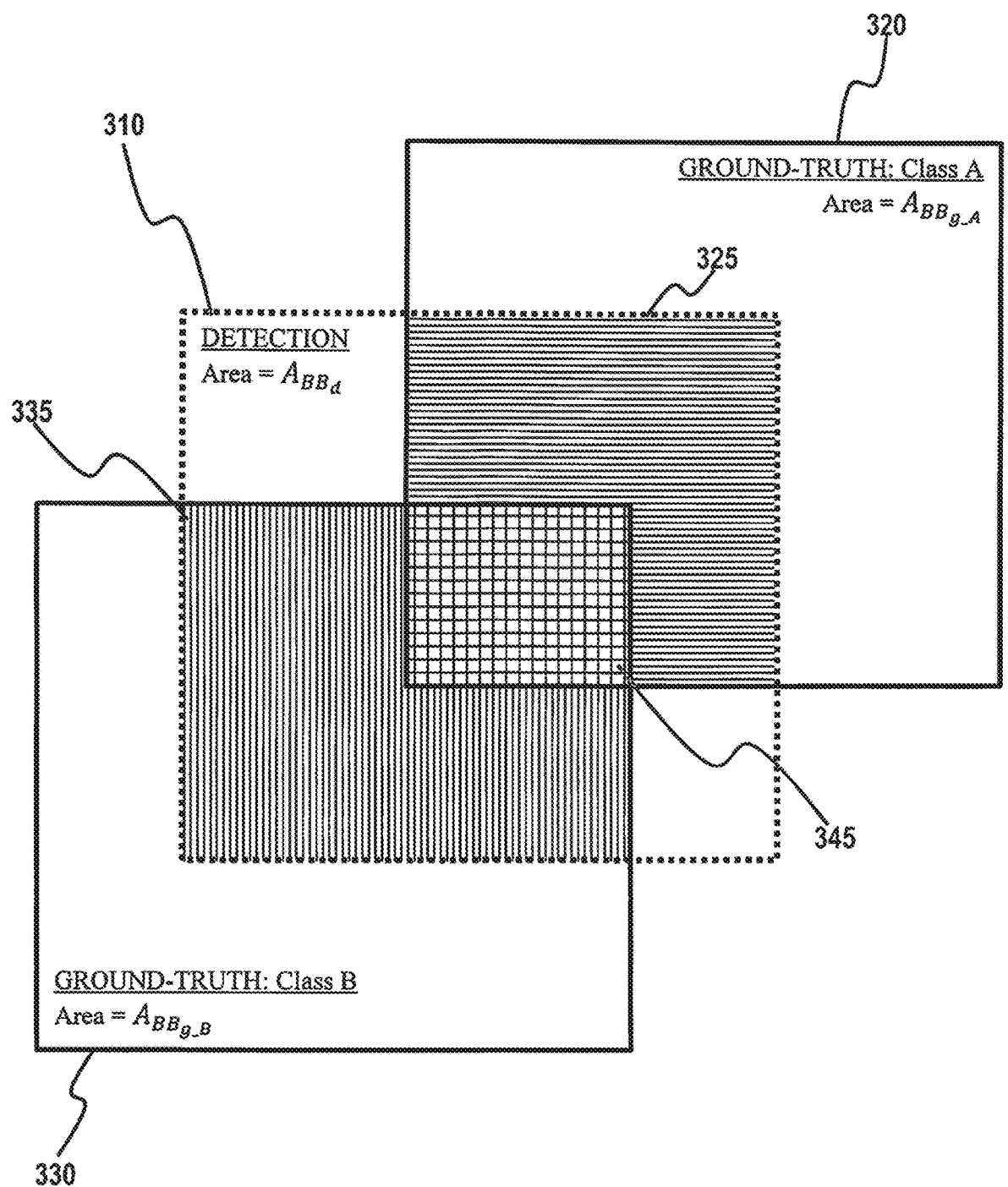
FIG. 3 illustrates examples of soft labelling assignment schemes when there are multiple classes (i.e., multiple ground-truth boxes), according to one embodiment.

FIG. 3 illustrates examples of soft labelling assignment schemes when there are multiple classes (i.e., multiple ground-truth boxes), according to one embodiment. In other words, FIG. 2 only considered class A and the default class, background, while FIG. 3 considers classes A and B, as well as the default class, background.

In FIG. 3, detection box 310 covers area $A_{BB_d}$, ground-truth box 320 for class A covers area $$A_{BB_{g\_A}},$$

and ground-truth box 330 for class B covers area $$A_{BB_{g\_B}}.$$

The area where all three boxes intersect is indicated by gridlined box 345; the area where only detection box 310 and ground-truth box 320 for class A is indicated by reverse-Γ-shaped and horizontally-lined portion 325; and the area where only detection box 310 and ground-truth box 330 for class B is indicated by L-shaped and vertically-lined portion 335. Thus, the total overlap of detection box 310 and ground-truth box 320 for class A is both grid box 345 and horizontally-lined portion $$335(= A_{BB_d} \cap A_{BB_{g\_A}}),$$

and the total overlap of detection box 310 and ground-truth box 330 for class B is both grid box 345 and vertically-lined portion 325

$$(= A_{BB_d} \cap A_{BB_{g\_B}}).$$

Grid box 345 is not only the overlap of all three boxes, but also the overlap of the two ground-truth boxes, and thus $$A_{BB_d} \cap A_{BB_{g\_A}} \cap A_{BB_{g\_B}} = A_{BB_{g\_A}} \cap A_{BB_{g\_B}}.$$

According to one embodiment of the present disclosure, the labels of detection box 310 for class/object A ($L_A$), class/object B ($L_B$), and background ($L_{bg}$) are determined according to Equations (7)(a) through (7)(c):

$$L_A = \frac{A_{BB_d} \cap A_{BB_{g\_A}} - 0.5 \times (A_{BB_{g\_A}} \cap A_{BB_{g\_B}})}{A_{BB_d}} \quad (7)(a)$$

$$L_B = \frac{A_{BB_d} \cap A_{BB_{g\_B}} - 0.5 \times (A_{BB_{g\_A}} \cap A_{BB_{g\_B}})}{A_{BB_d}} \quad (7)(b)$$

$$L_{bg} = 1 - L_A - L_B \quad (7)(c)$$

Accordingly, one half of the overlap/intersection of ground-truth box 320 for class A and ground-truth box 330 for class $$B\left(= \text{grid box } 345 = A_{BB_{g\_A}} \cap A_{BB_{g\_B}}\right)$$

is subtracted from each of the intersection/overlap of detection box 310 and ground-truth box 320 for class $$A\left(= A_{BB_d} \cap A_{BB_{g\_A}}\right)$$

in Equation (7)(a), and of the intersection/overlap of detection box 310 and ground-truth box 330 for class $$B\left(= A_{BB_d} \cap A_{BB_{g\_B}}\right)$$

in Equation (7)(a), before being normalized (i.e., divided by the total area of the detection box 310).

In other words, the overlap area of the ground-truth boxes is divided between them when assigning their labels.

In another embodiment, the overlap area is assigned to the class with the highest confidence score (from the previous detection stage). For example, if detection box 310 has a higher confidence score for class A, the labels of detection box 310 for class/object A ($L_A$), class/object B ($L_B$), and background ($L_{bg}$) are determined according to Equations (8)(a) through (8)(c):

$$L_A = \frac{A_{BB_d} \cap A_{BB_{g\_A}}}{A_{BB_d}} \quad (8)(a)$$

$$L_B = \frac{A_{BB_d} \cap A_{BB_{gB}} - (A_{BB_{g\_A}} \cap A_{BB_{g\_B}})}{A_{BB_d}} \quad (8)(b)$$

$$L_{bg} = 1 - L_A - L_B \quad (8)(c)$$

Both of the assignment schemes described with reference to FIG. 3 and Equations (7)(a)-(7)(c) and (8)(a)-(8)(c) above may be generalized to any arbitrary number of classes.

In one embodiment of the present disclosure, the detection boxes are generated using a primary object detection and classification framework, such as a single shot detector (SSD), which is used an object candidate generator. The candidate detections are then further classified by a secondary classification network to belong to a class of interest. For further details regarding such a framework, see Du et al., *Fused DNN: A deep neural network fusion approach to fast and robust pedestrian detection*, arXiv:1610.034466v1 (11 Oct. 2016), which is incorporated herein by reference in its entirety. In this framework, the candidate object detections from the primary network are overlapped with ground truth boxes to further label them by kind/type of object. In the embodiment of the present disclosure, the secondary classification network is trained by soft labels, using the relative overlap area(s) of each class as described above. By contrast, the conventional hard labels are generated according to whether the intersection of both boxes over their union area is greater than 50% (i.e., Equation (1) above), and is only applicable for one class and the default background class.

In experiments/simulations using the ETH and INRIA datasets (as defined in Ess et al., *A mobile vision system for robust multi-person tracking*, in IEEE Conference on Computer Vision and Pattern Recognition (CVPR'08), IEEE Press, June 2008, which is incorporated herein by reference in its entirety) to train deep learning machines (i.e., ResNet and GoogleNet) to detect pedestrians in images, the soft labelling technique using threshold/boundaries, like Eqs. (6)(a)-(6)(b) above, was applied. Specifically, the lower threshold for the overlap was 0.3, below which a label of 0 would be assigned, and the upper threshold was 0.7, above which a label of 1 would be assigned. Between 0.3 and 0.7, a range of variable values are assigned as labels, the particular values depending on the specific equation being used (e.g., Eqs. (5)(a), (6)(a), (7)(a), (7)(b), etc.). In another experiment/simulation, the threshold values were 0.4 and 0.6.

Since the overlap ratio between the candidate bounding box and the ground truth bounding box is used to assign the labels, the soft labeling method indicates not only whether a pedestrian (i.e., object) exists in each candidate bounding box, but also gives how much area the pedestrian occupies in each candidate bounding box (that contains a pedestrian). This is especially useful in the boundary cases where the overlap ratio is around 0.5 and the hard labeling method is at borderline. The pedestrian missed detection rate performance comparisons of the hybrid soft-hard labeling method improved to 30.4% from 33% pedestrian missed detection rate achievable by hard-labeling method on the ETH dataset.

Soft labelling in accordance with the present disclosure may be applied to multi-task deep learning approaches such as region-based convolutional neural networks (R-CNN). See, e.g., Ren et al., *Faster R-CNN: Towards Real-Time Object Detection with Region Proposal Networks*, arXiv: 1506.01497v3 (6 Jan. 2016), which is incorporated herein by reference in its entirety. In such networks, the region proposal networks (RPN) provide object/no object detection. These detections are then further classified by region of interest (ROI) classification layer as one of k classes. In an embodiment applying soft labelling, the soft labels are generated from the detections output from the RPN. Any soft-labelling assignment scheme may be used, including the use of thresholds for multiple levels, which, if 0 and 1 are assigned in two of the tiers, may be called a "hybrid" scheme involving a combination of soft- and hard-labelling, but is properly called a soft labelling assignment scheme in accordance with the meaning of that term as used herein. Soft labelling provides greater precision and accuracy in comparison with hard labelling, which back-propagates the gradients in the multi-task deep learning approach from the detections corresponding to the true class only.

In the embodiments above, two stages are assumed: detection and classification, where the detection stage generates the class/object detection boxes and the class/object ground truth boxes whose relative overlap ratios are used to assign soft labels in the classification stage. Thus, the classification stage can be viewed as an effort to determine the a priori probability of each class for each detection candidate, where the sum of probabilities is 1. However, in general, the soft labeling technique is more broadly applicable and does not require a detection stage.

Broadly speaking, soft labelling according to the present disclosure can be used as a mechanism to generate a priori probability for classification based on an input feature. The specific method implemented to generate this a priori probability depends on the context, as would be understood by one of ordinary skill in the art.

In the context of classification in a non-detection framework, the soft labels can be extracted and assigned using other side information, such as generated by, for example, secondary classification mechanisms or simpler low complexity classification mechanisms, such as used in non-deep learning fast classification systems, which would give an a priori probability for each class without a separate detection stage. Side information is any information about the detection object not provided directly by the observed object.

For example, a phone classification system for acoustic modelling for automatic speech processing may use soft labelling in accordance with the present disclosure. A "phone" is similar to a "phoneme", but much less abstract—a phone is any distinct speech sound regardless of whether that sound is critical to the meaning of the word, and regardless of the language involved, whereas phonemes involve meaning and can only be discussed in reference to specific languages. In simple terms, a "phone" is a unit of sound made by a human voice.

Thus, one key difference between a phone classification system and an image classification systems is that there is no ground truth for phone classification on the acoustic level, but instead ground truth exists only at the word or letter level. Accordingly, other mechanisms are used to give a preliminary classification which is then used to generate a soft label for each class for each input feature element in the training set.

In acoustic model classification, each input acoustic feature is normally labelled 1 for the best matching phone, and 0 otherwise. This binary labeling is generated by hard decision decoding on classification scores from a simpler mechanism such as a hidden Markov Model (HMM), a Gaussian mixture model as HMM (GMM-HMM), or another simpler neural network, in a process called alignment.

In an embodiment according to the present disclosure, instead of hard-decision labeling based on hard-decision decoding, soft labels can be generated directly from the classification scores from a simpler model/mechanism (such as, for example, the HMM and GMM-HMM classification mechanisms mentioned above, or a simpler pretrained neural network).

Alternatively, soft labels can be extracted from the list decoder on the input acoustic feature frame. A list decoder provides a list of the most probable sequences of phones, whereas a non-list decoder provides only the most plausible sequence of phones. An acoustic feature frame corresponds to a temporal window of acoustic features of the observed speech. The L best paths are chosen, from which a soft classification label can be extracted for each possible phone to correspond to each aligned input acoustic feature. These soft labels can be deployed to train the entire classification network.

In one embodiment, maximum likelihood decoding is used to extract the soft labels. Given input acoustic feature vector F, T is the set of all possible paths through a trellis of phones p—i.e., T is the set of all possible aligned sequences $S_i$ of phones p for the input acoustic feature vector F. Then the soft label for the kth frame in the sequence $S_i$ to be classified is the probability that $S_{i,k}$ can be classified as one of the possible phones p as shown in Equation (9):

$$P(S_{i,k} = p \mid F) = \frac{\Sigma_{S_i \in T, s_{i,k}=p} P(S_i \mid F)}{\Sigma_{S_i \in T} P(S_i \mid F)} \qquad (9)$$

From Equation (9) above, it can be seen that this soft labelling scheme also satisfies the label criterion that the sum over all classes is one, as discussed above in reference to Equation (4). In other words, if C is the set of all possible phones, $\Sigma_{p \in C} P(S_{i,k}=p|F)=1$.

$P(S_i|F)$, the probability of ith possible sequence $S_i$ given input acoustic feature vector F, can be calculated from the aggregated metric of the path.

If a distance metric is used, where the ith possible sequence $S_i$ has length N, then $M_i$, which can be regarded as the squared distance metric, can be determined as shown in Equation (10)(a):

$$M_i = \sum_{k=1:N} (S_{i,k} - F_k)^2 \qquad (10)(a)$$

The likelihood is inversely proportional to the squared distance metric and can be given by Equation (10)(b):

$$P(S_i|F) \approx e^{-M_i} \qquad (10)(b)$$

It is well known to those skilled in the art that the forward-backward algorithm can be used to estimate the maximum a posteriori (MAP) solution $P(S_{i,k}=p|F)$ without exponential complexity.

If a list decoding scheme or an L-best decoder is used which outputs only the L-best sequences using a non-MAP decoder, the complexity can be reduced even more by limiting the summation in Equation (9) to the L-best sequences only. In mathematical terms, if $T_L$ corresponds to the subset of T with the sequences of size L output from the list decoder or L-best decoder, then the soft label for the kth frame in the sequence $S_i$ (within set $T_L$) is the probability that $S_{i,k}$ can be classified as one of the possible phones p, as shown in Equation (11):

$$P(S_{i,k} = p \mid F) = \frac{\sum_{s_i \in T_L, s_{i,k}=p} P(S_i \mid F)}{\sum_{s_i \in T_L} P(S \mid F)} \quad (11)$$

As shown by the embodiments described above, the soft labelling technique described herein has many novel aspects, including labelling of images based on the areas of intersection between detection bounding boxes and ground-truth bounding boxes in the classification stage. Soft labelling provides a very wide variety of possible assignment schemes, such as, for example, where the label values of 0 or 1 may be used with a variable label value between 0 and 1 based on the areas of intersection between detection bounding boxes and ground-truth bounding boxes (see, e.g., Equation (6)(a) above). Although sometimes called a "hybrid" or combination of hard- and soft-labelling, such an assignment scheme is properly covered under the term "soft-labelling" in the present disclosure.

As discussed above, experimental results have shown that soft-labelling outperforms hard-labelling when performing object detection using several popular datasets.

When multiple ground-truth bounding boxes overlap with each other inside the detection bounding boxes, many methods may be used in accordance with the present disclosure to ensure the label values still sum to one. Two examples discussed above were splitting the overlap area between classes (see, e.g., description in reference to Equations (7)(a)-(7)(c)) and assigning the entire overlap area to the class with the highest confidence score from the detection stage (see, e.g., description in reference to Equations (8)(a)-(8)(c)). However, one of ordinary skill in the art would recognize that many other methods may be used so that multiple classes overlapping with a detection bounding box may be manipulated in the label assignment scheme to ensure the sum of probabilities (label values) still adds to one.

Moreover, the soft-labelling technique described herein is not limited to image analysis and/or a deep learning system with both a detection and a classification stage. As discussed above, the soft labelling technique may be used with deep learning machines/systems applied to acoustic modelling and voice recognition, where there is no detection stage per se in the same manner as image analysis. Once again, these are only examples, and one of ordinary skill in the art would recognize the soft labelling according to the present disclosure may be used in training deep learning machines/systems with other applications.

Figure 4:
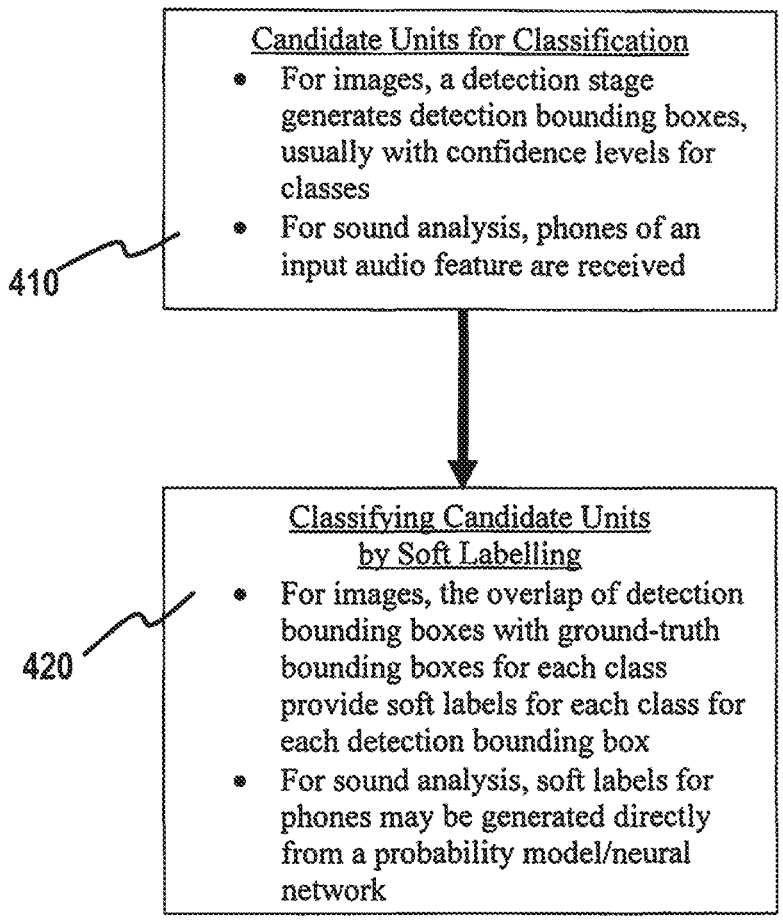
FIG. 4 is a flowchart illustrating a general method of deep learning training according to one embodiment.

FIG. 4 is a flowchart illustrating a general method for deep learning training according to an embodiment of the present disclosure. At 410, candidate units for classification are received. For a deep learning machine for images, a detection stage generates candidate detection bounding boxes, usually with confidence scores as well. For a deep learning machine for sound, phones of an input audio feature are received. At 420, the candidate units are classified by soft labelling, where at least one label has a range of possible values between 0 and 1. For a deep learning machine for images, the classification stage generates a soft label of a class for a detection bounding box based at least partially on the detection bounding box's overlap with a ground-truth bounding box for that class. For a deep learning machine for sound, soft labels for the phones of the input audio feature may be made directly from classification scores generated using a probability model and/or using a neural network such as, for example, a hidden Markov Model (HMM), a Gaussian mixture model (GMM), relatively simple pre-trained neural network, maximum likelihood decoding, a distance metric, a soft output decoding algorithm, or a list decoding scheme.

As mentioned above, soft labelling assignment schemes in accordance with the present disclosure includes schemes where only one label takes some range of values between 0 and 1 while one or more other labels only take 0 or 1 as their value (such schemes may also be referred to as "hybrid" schemes, in the sense that "hard" labels can only be 0 or 1, while "soft" labels can take a range of values between 0 or 1).

Figure 5:
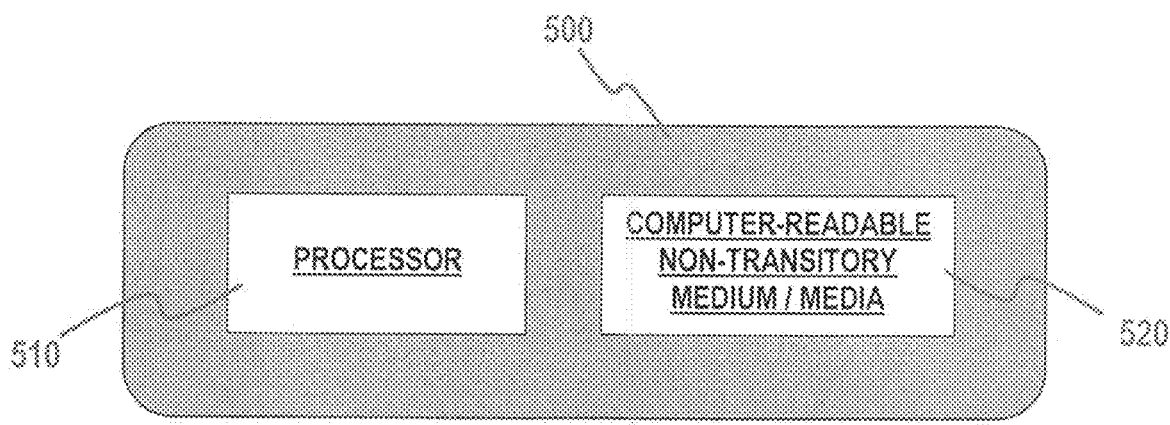
FIG. 5 illustrates an exemplary diagram of the present apparatus, according to one embodiment.

FIG. 5 illustrates an exemplary diagram of the present apparatus for deep learning training, according to one embodiment. An apparatus 500 includes at least one processor 510 and one or more non-transitory computer readable media 520. The at least one processor 510, when executing instructions stored on the one or more non-transitory computer readable media 520, performs the steps of receiving candidate units for classification; and classifying the candidate units by soft labelling, wherein the soft labelling provides at least one label comprising a plurality of possible values in a range between 0 and 1. Moreover, the one or more non-transitory computer-readable media 520 stores instructions for the at least one processor 510 to perform the above-listed steps.

Figure 6:
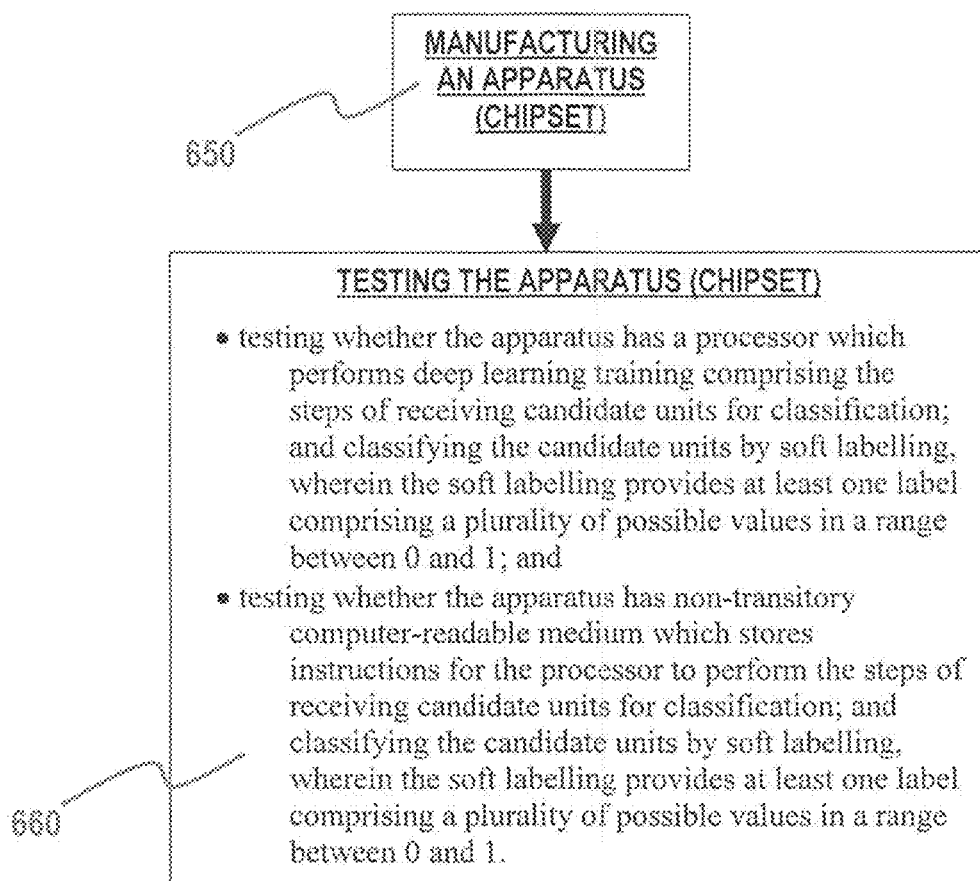
FIG. 6 illustrates an exemplary flowchart for manufacturing and testing the present apparatus, according to one embodiment.

FIG. 6 illustrates an exemplary flowchart for manufacturing and testing the present apparatus, according to one embodiment.

At 650, the apparatus (in this instance, a chipset) capable of deep learning training is manufactured, including at least one processor and one or more non-transitory computer-readable media. When executing instructions stored on the one or more non-transitory computer readable media, the at least one processor performs the steps of receiving candidate units for classification; and classifying the candidate units by soft labelling, wherein the soft labelling provides at least one label comprising a plurality of possible values in a range between 0 and 1. The one or more non-transitory computer-readable media store instructions for the at least one processor to perform the above-listed steps.

At 660, the apparatus (in this instance, a chipset) is tested. Testing 660 includes testing whether the apparatus has at least one processor which, when executing instructions stored on one or more non-transitory computer readable media, performs deep learning training comprising the steps of receiving candidate units for classification; and classifying the candidate units by soft labelling, wherein the soft labelling provides at least one label comprising a plurality of possible values in a range between 0 and 1; and testing whether the apparatus has the one or more non-transitory computer-readable media which store instructions for the at least one processor to perform the steps of receiving candidate units for classification; and classifying the candidate units by soft labelling, wherein the soft labelling provides at least one label comprising a plurality of possible values in a range between 0 and 1.

The steps and/or operations described above in relation to an embodiment of the present disclosure may occur in a different order, or in parallel, or concurrently for different epochs, etc., depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple microcontrollers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Some embodiments of the present disclosure may be implemented, at least in part, on a portable device. "Portable device" and/or "mobile device" as used herein refers to any portable or movable electronic device having the capability of receiving wireless signals, including, but not limited to, multimedia players, communication devices, computing devices, navigating devices, etc. Thus, mobile devices include (but are not limited to) user equipment (UE), laptops, tablet computers, Portable Digital Assistants (PDAs), mp3 players, handheld PCs, Instant Messaging Devices (IMD), cellular telephones, Global Navigational Satellite System (GNSS) receivers, watches, or any such device which can be worn and/or carried on one's person.

Various embodiments of the present disclosure may be implemented in an integrated circuit (IC), also called a microchip, silicon chip, computer chip, or just "a chip," as would be understood by one of ordinary skill in the art, in view of the present disclosure. Such an IC may be, for example, a broadband and/or baseband modem chip.

While several embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

What is claimed is:

1. A method for deep learning training, comprising:
receiving a candidate unit for classification, the candidate unit including an intersection area between a ground-truth bounding box and a detection box;
classifying the candidate unit by labelling, wherein labelling comprises:
assigning a label of 0 when a value based on the intersection area is below a first threshold value;
assigning a label of 1 when the value based on the intersection area is above a second threshold value; and
assigning a label from a range of values between 0 and 1 when the value based on the intersection area is above the first threshold value and below the second threshold value, the label from the range of values being a probability value that a given feature is observed in the intersection area; and
performing deep learning training using the assigned label of the classified candidate unit.

2. The method of claim 1, wherein the candidate unit is within an image.

3. The method of claim 1,
wherein labelling comprises:
providing a label of a class for the detection box based at least partially on the intersection area for the class.

4. The method of claim 3, wherein providing a label of a class comprises:
assigning a class label whose value is derived using the intersection area.

5. The method of claim 3, wherein providing a label of a class comprises:
assigning a class label whose value is derived from a ratio involving the intersection area.

6. The method of claim 5, wherein assigning a class label comprises:
calculating the ratio of the intersection area to an entire area of the detection box.

7. The method of claim 3, wherein providing a label of a class for the detection box is also based on one or more confidence levels provided by a detection stage which also provided the detection box.

8. The method of claim 3, wherein providing a label of a class for a detection box comprises:
providing a label of a first class for the detection box based at least partially on the intersection area for the first class; and
providing a label of a second class for the detection box based at least partially on the intersection area for the second class.

9. The method of claim 3, wherein the value based on the intersection area for the class is a ratio of the intersection area to an entire area of the detection box.

10. The method of claim 1,
wherein labelling comprises:
generating soft labels directly from classification scores from a probability model or neural network.

11. The method of claim 1,
wherein labelling comprises:
generating soft labels directly from classification scores from a hidden Markov Model (HMM), a Gaussian mixture model (GMM), or a pretrained neural network.

12. The method of claim 1,
wherein labelling comprises:
generating soft labels using maximum likelihood decoding, a distance metric, a soft output decoding algorithm, or a list decoding scheme.

13. An apparatus for deep learning training, comprising:
one or more non-transitory computer-readable media; and
at least one processor which, when executing instructions stored on one or more non-transitory computer readable media, performs the steps of:
receiving a candidate unit for classification, the candidate unit including an intersection area between a ground-truth bounding box and a detection box;
classifying the candidate units by labelling, wherein labelling comprises:
  assigning a label of 0 when a value based on the intersection area is below a first threshold value;
  assigning a label of 1 when the value based on the intersection area is above a second threshold value; and
  assigning a label from a range of values between 0 and 1 when the value based on the intersection area is above the first threshold value and below the second threshold value, the label from the range values being a probability value that a given feature is observed in the intersection area; and
performing deep learning training using the assigned label of the classified candidate unit.

14. The apparatus of claim 13,
wherein labelling comprises:
providing a label of a class for a detection bounding box based at least partially on the intersection area.

15. The apparatus of claim 13,
wherein labelling comprises:
generating soft labels directly from classification scores from a probability model or a neural network.

16. A method, comprising:
manufacturing a chipset capable of deep learning training comprising:
at least one processor which, when executing instructions stored on one or more non-transitory computer readable media, performs the steps of:
receiving a candidate unit for classification, the candidate unit including an intersection area between a ground-truth bounding box and a detection box;
classifying the candidate units by labelling, wherein labelling comprises:
  assigning a label of 0 when a value based on the intersection area is below a first threshold value;
  assigning a label of 1 when the value based on the intersection area is above a second threshold value; and
  assigning a label from a range of values between 0 and 1 when the value based on the intersection area is above the first threshold value and below the second threshold value, the label from the range of values being a probability value that a given feature is observed in the intersection area; and
performing deep learning training using the assigned label of the classified candidate unit; and
the one or more non-transitory computer-readable media which store the instructions.

17. A method of testing an apparatus, comprising:
testing whether the apparatus has at least one processor which, when executing instructions stored on one or more non-transitory computer readable media, performs deep learning training comprising the steps of:
receiving a candidate unit for classification, the candidate unit including an intersection area between a ground-truth bounding box and a detection box;
classifying the candidate units by labelling, wherein labelling comprises:
  assigning a label of 0 when a value based on the intersection area is below a first threshold value;
  assigning a label of 1 when the value based on the intersection area is above a second threshold value; and
  assigning a label from a range of values between 0 and 1 when the value based on the intersection area is above the first threshold value and below the second threshold value, the label from the range of values being a probability value that a given feature is observed in the intersection area;
performing deep learning training using the assigned label of the classified candidate unit; and
testing whether the apparatus has the one or more non-transitory computer-readable media which store the instructions.

* * * * *